(12) United States Patent
Soriano

(10) Patent No.: US 10,154,653 B2
(45) Date of Patent: Dec. 18, 2018

(54) HARNESSING ASSEMBLY

(71) Applicant: Irving H. Soriano, Chicago, IL (US)

(72) Inventor: Irving H. Soriano, Chicago, IL (US)

(*) Notice: Subject to any disclaimer, the term of this patent is extended or adjusted under 35 U.S.C. 154(b) by 187 days.

(21) Appl. No.: 15/211,212

(22) Filed: Jul. 15, 2016

(65) Prior Publication Data

US 2018/0014510 A1    Jan. 18, 2018

(51) Int. Cl.
  *A01K 27/00*    (2006.01)

(52) U.S. Cl.
  CPC .................................. *A01K 27/002* (2013.01)

(58) Field of Classification Search
  CPC ............................. A01K 27/002; A01K 1/0263
  USPC ................................................. 119/863, 907
  See application file for complete search history.

(56) References Cited

U.S. PATENT DOCUMENTS

| | | | |
|---|---|---|---|
| 3,769,939 A | 11/1973 | Wais et al. | |
| 4,964,369 A * | 10/1990 | Sporn | A01K 27/002 119/818 |
| 5,247,905 A * | 9/1993 | Arakawa | A01K 27/002 119/863 |
| 5,329,885 A | 7/1994 | Sporn | |
| 5,335,627 A * | 8/1994 | Bandimere | A01K 27/002 119/856 |
| 5,359,964 A * | 11/1994 | Sporn | A01K 27/002 119/792 |
| 5,370,083 A * | 12/1994 | Sporn | A01K 27/002 119/864 |
| 5,676,093 A * | 10/1997 | Sporn | A01K 27/002 119/792 |
| 5,682,840 A * | 11/1997 | McFarland | A01K 27/002 119/792 |
| 6,085,694 A | 7/2000 | Simon | |
| 6,101,979 A | 8/2000 | Wilson et al. | |
| 6,463,888 B2 * | 10/2002 | Clark | A01K 27/002 119/792 |
| 6,637,377 B2 * | 10/2003 | Lobanoff | A01K 1/0263 119/770 |
| 6,708,650 B1 * | 3/2004 | Yates | A01K 27/002 119/712 |
| 6,827,044 B2 * | 12/2004 | Lobanoff | A01K 1/0263 119/771 |
| 7,165,511 B1 * | 1/2007 | Brezinski | A01K 27/002 119/792 |
| 7,357,099 B2 * | 4/2008 | Smith | A01K 1/0263 119/771 |
| 7,370,608 B1 * | 5/2008 | Friedman | A01K 13/006 119/850 |

(Continued)

*Primary Examiner* — Joshua D Hudson

(57) ABSTRACT

A harnessing assembly for animals includes a strap. Each of a pair of connectors is coupled to the strap. The strap is couplable to each connector to form a pair of first loops. Each of a pair of first fasteners is slidably coupled to a respective first loop. A coupler is coupled proximate to a midpoint of the strap. The coupler is configured to couple to a leash. Each of a pair of strips is coupled to and extends from a front edge of the first strip, bracketing the coupler. A pair of second fasteners, which is complementary to the first fasteners, is coupled singly to the strips distal from the front edge. Each second fastener is positioned to couple to a respective first fastener to form a second loop. Each second loop comprises a respective first loop, such that the second loop is adjustably sizable.

12 Claims, 3 Drawing Sheets

(56) References Cited

U.S. PATENT DOCUMENTS

| | | | | |
|---|---|---|---|---|
| 7,757,641 B1* | 7/2010 | Worden | ............... | A01K 27/002 |
| | | | | 119/792 |
| D632,850 S | 2/2011 | Light et al. | | |
| 7,891,322 B2* | 2/2011 | Bennett | ............... | A01K 27/005 |
| | | | | 119/856 |
| 8,015,947 B2* | 9/2011 | Arreola | ............... | A01K 27/002 |
| | | | | 119/792 |
| 8,261,699 B2* | 9/2012 | Cho | ..................... | A01K 27/002 |
| | | | | 119/792 |
| 8,281,748 B2* | 10/2012 | Elkins | ...................... | A01K 1/04 |
| | | | | 119/792 |
| 8,608,629 B2* | 12/2013 | Latronica | ............... | A63B 21/16 |
| | | | | 482/121 |
| 9,032,910 B2 | 5/2015 | Sandler | | |
| 9,089,110 B2* | 7/2015 | Lai | ....... | A01K 27/003 |
| 9,332,734 B1* | 5/2016 | Hege | ................... | A01K 27/002 |
| 2002/0053324 A1* | 5/2002 | Kato | ................... | A01K 13/006 |
| | | | | 119/856 |
| 2003/0097736 A1* | 5/2003 | Blankenship | .......... | A63B 57/00 |
| | | | | 24/302 |
| 2006/0112903 A1* | 6/2006 | Zutis | .................... | A01K 27/002 |
| | | | | 119/792 |
| 2008/0105216 A1* | 5/2008 | Sporn | ................. | A01K 27/002 |
| | | | | 119/863 |
| 2008/0184943 A1* | 8/2008 | Brauer | ................ | A01K 27/002 |
| | | | | 119/792 |
| 2012/0234261 A1* | 9/2012 | Nelson | ................ | A01K 27/002 |
| 2014/0020634 A1* | 1/2014 | Kissel, Jr. | ............ | A01K 27/002 |
| | | | | 119/712 |

* cited by examiner

HARNESSING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to harnessing assemblies and more particularly pertains to a new harnessing assembly for animals.

BRIEF SUMMARY OF THE INVENTION

An embodiment of the disclosure meets the needs presented above by generally comprising a strap. Each of a pair of connectors is coupled to the strap. The strap is couplable to each connector to form a pair of first loops. Each of a pair of first fasteners is slidably coupled to a respective first loop. A coupler is coupled proximate to a midpoint of the strap. The coupler is configured to couple to a leash. Each of a pair of strips is coupled to and extends from a front edge of the first strip, bracketing the coupler. A pair of second fasteners, which is complementary to the first fasteners, is coupled singly to the strips distal from the front edge. The midpoint of the strap is configured to position on a back side of a neck of an animal. Each second fastener is positioned to couple to a respective first fastener to form a second loop. Each second loop comprises a respective first loop, such that the second loop is adjustably sizable. The second loops are configured to position transversely across a chest of the animal. Front legs of the animal are positioned singly through the second loops, such that the animal is harnessed. The coupler is positioned on the strap such that the coupler is configured to couple the harnessed animal to a leash.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
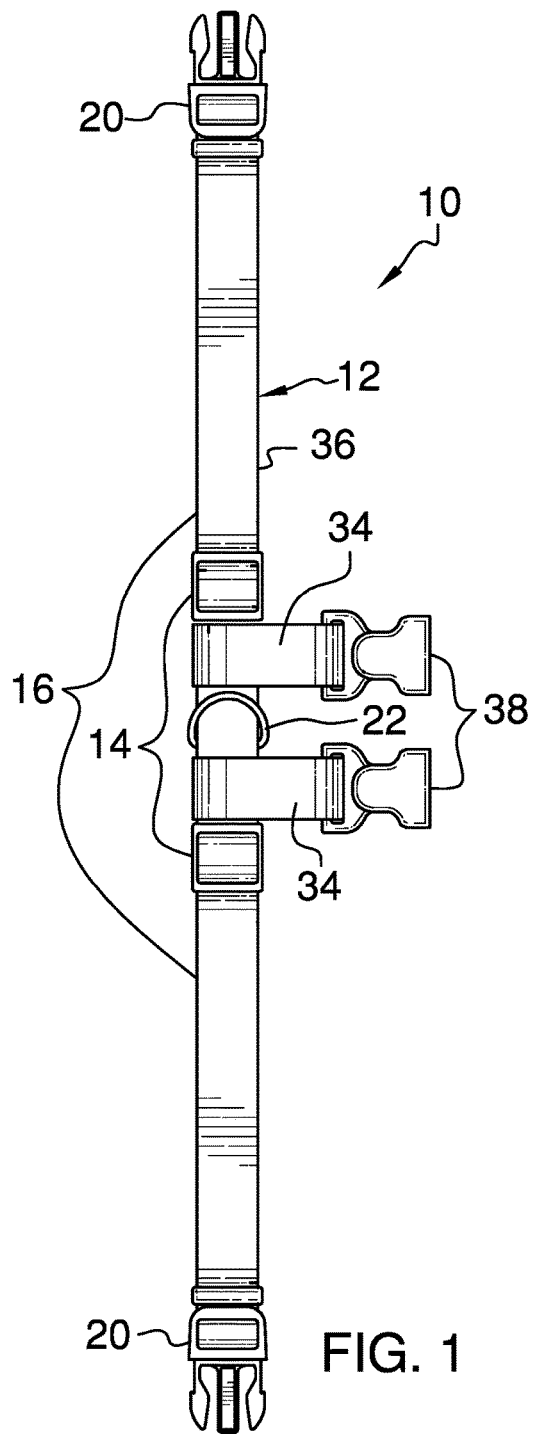
FIG. 1 is a top view of a harnessing assembly according to an embodiment of the disclosure.
Figure 2:
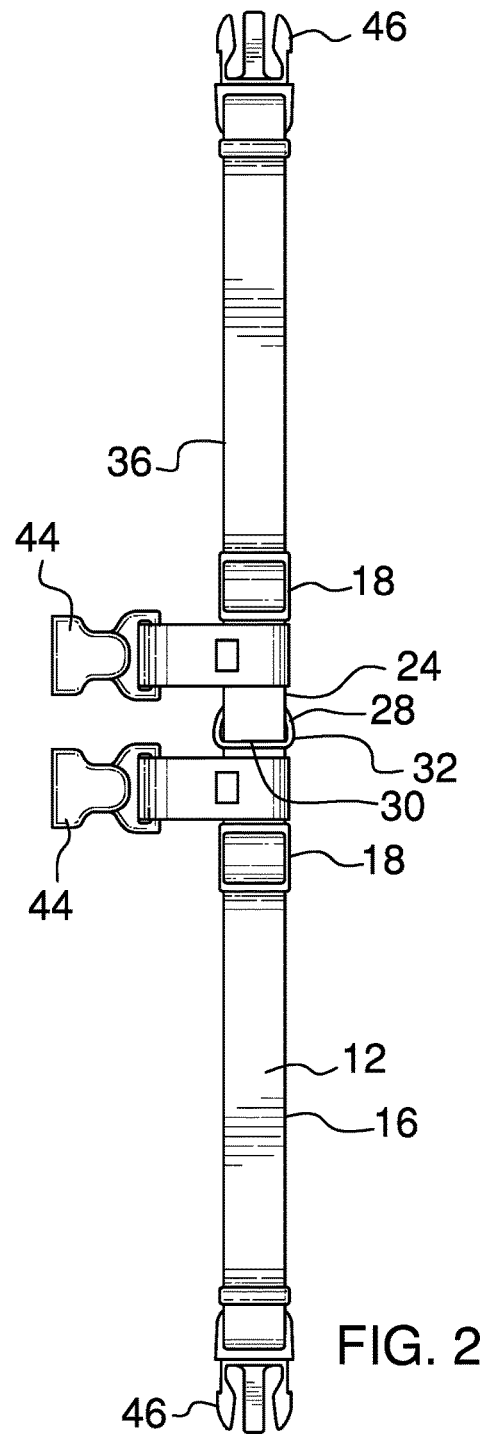
FIG. 2 is a bottom view of an embodiment of the disclosure.
Figure 3:
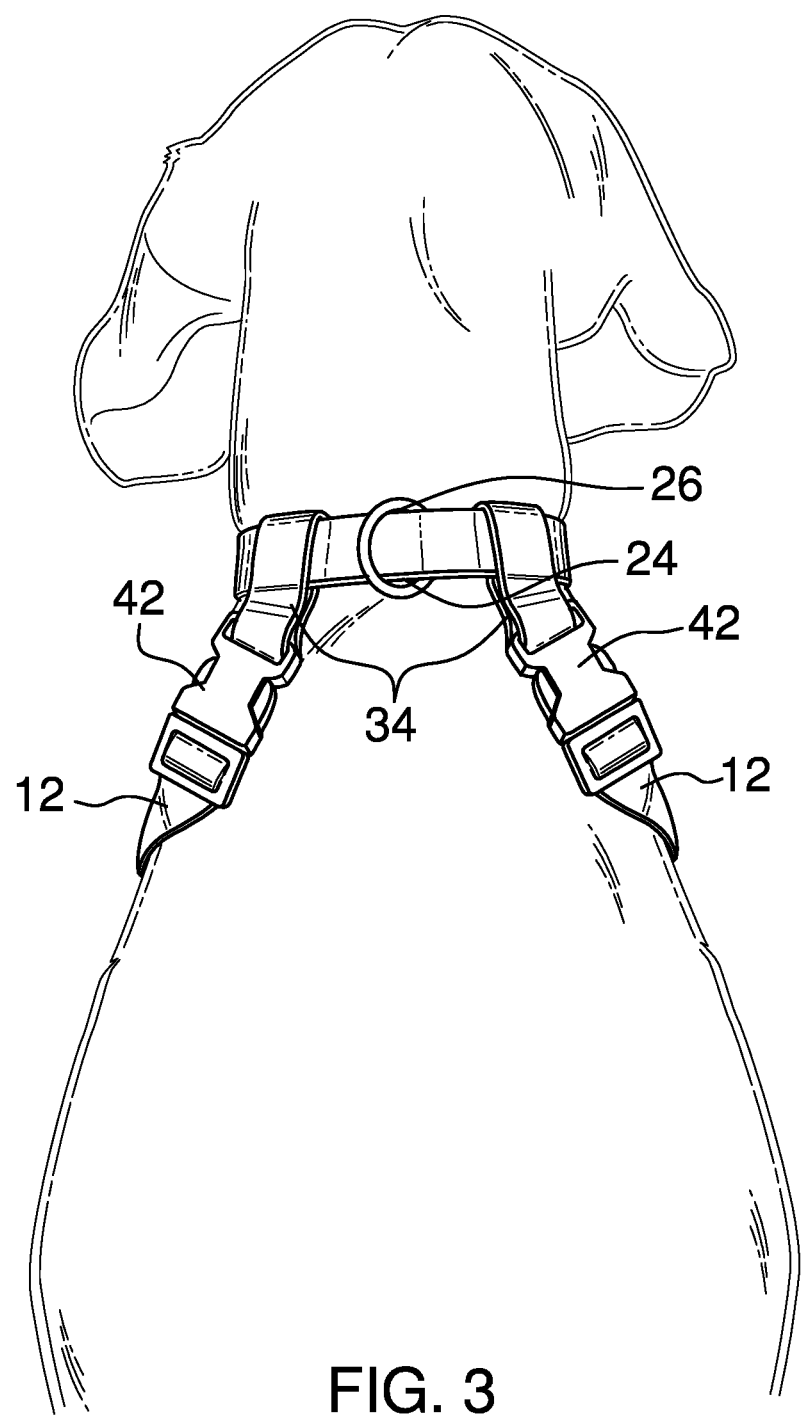
FIG. 3 is an in-use view of an embodiment of the disclosure.
Figure 4:
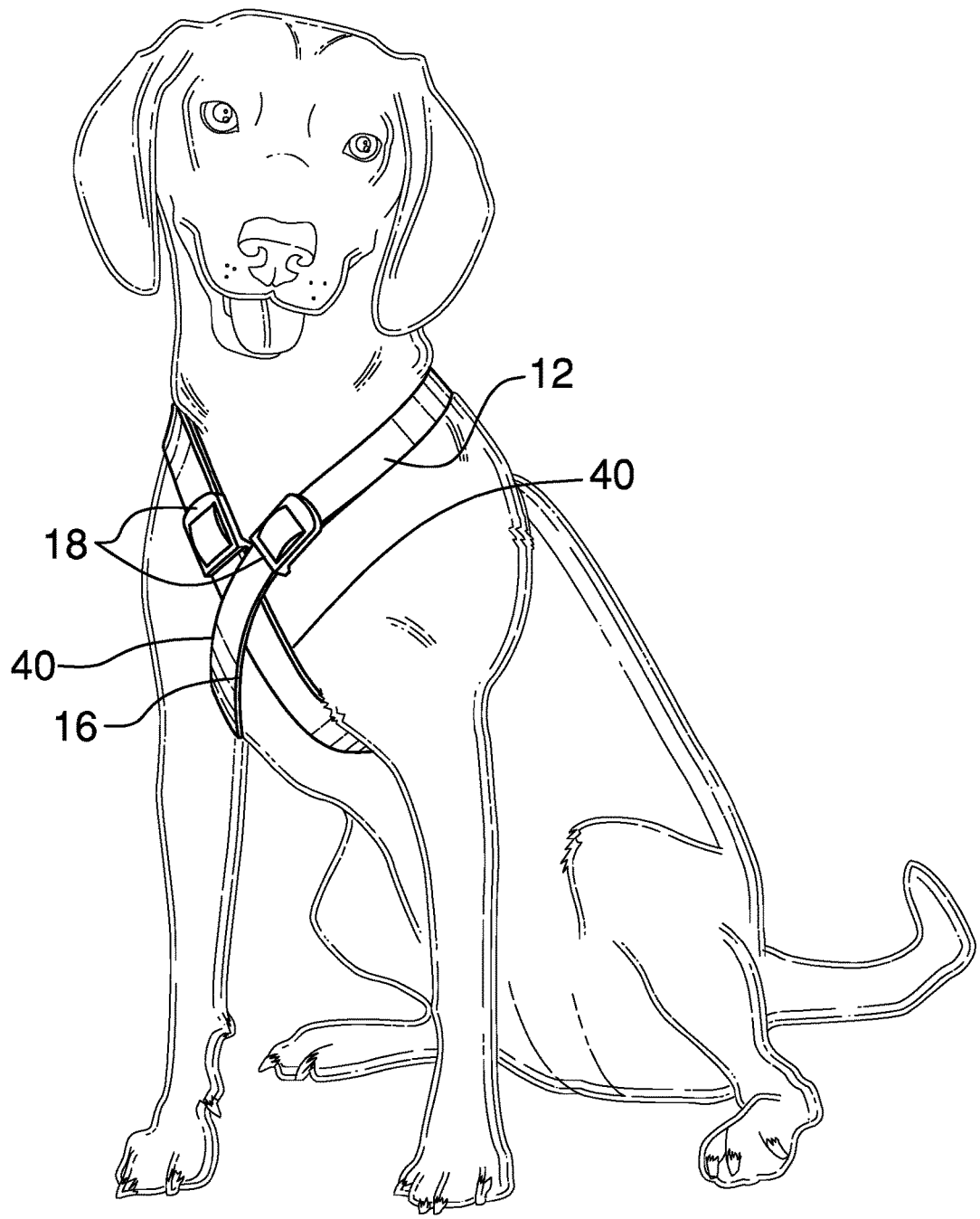
FIG. 4 is an in-use view of an embodiment of the disclosure.

With reference now to the drawings, and in particular to FIGS. 1 through 4 thereof, a new harnessing assembly embodying the principles and concepts of an embodiment of the disclosure and generally designated by the reference numeral 10 will be described.

As best illustrated in FIGS. 1 through 4, the harnessing assembly 10 generally comprises a strap 12. In one embodiment, the strap 12 comprises nylon mesh. Each of a pair of connectors 14 is coupled to the strap 12. The strap 12 is couplable to each connector 14 to form a pair of first loops 16. In one embodiment, the pair of connectors 14 comprises slide buckles 18. In another embodiment, the slide buckles 18 comprises plastic.

Each of a pair of first fasteners 20 is slidably coupled to a respective first loop 16. A coupler 22 is coupled proximate to a midpoint 24 of the strap 12. The coupler 22 is configured to couple to a leash. In one embodiment, the coupler 22 comprises a ring 26 positioned around the strap 12. In another embodiment, the ring 26 comprises metal. In yet another embodiment, the ring 26 comprises a first section 28 and a second section 30. The second section 30 is coupled to and extends between opposing ends 32 of the first section 28. In yet another embodiment, the first section 28 is arcuate.

Each of a pair of strips 34 is coupled to and extends from a front edge 36 of the first strip. Each strip 34 is positioned proximate to the midpoint 24 of the strap 12, such that the pair of strips 34 brackets the coupler 22. In one embodiment, the strips 34 extend substantially perpendicularly from the front edge 36. In another embodiment, the strips 34 comprise nylon mesh.

A pair of second fasteners 38 is coupled singly to the pair of strips 34 distal from the front edge 36. The second fasteners 38 are complementary to the first fasteners 20. Each the second fastener 38 is positioned on a respective strip 34 and is positioned to couple to a respective first fastener 20 to form a second loop 40. Each second loop 40 comprises a respective first loop 16, such that the second loop 40 is adjustably sizable. In one embodiment, the second fastener 38 and the respective first fastener 20 comprise a side release buckle 42. In another embodiment, the side release buckle 42 comprises plastic. In yet another embodiment, the second fastener 38 comprises a catch end 44 of the side release buckle 42 and the respective first fastener 20 comprises a hook end 46 of the side release buckle 42.

In use, the midpoint 24 of the strap 12 is configured to position on a back side of a neck of an animal. Each second fastener 38 is positioned to couple to a respective first fastener 20 to form a second loop 40. The second loops 40 are configured to position transversely across a chest of the animal. The front legs of the animal are positioned singly through the second loops 40, such that the animal is harnessed. The coupler 22 is positioned on the strap 12 and is configured to couple the harnessed animal to a leash.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A harnessing assembly comprising:
   a strap;
   a pair of connectors, each said connector being coupled to said strap, said strap being couplable to each said connector to form a pair of first loops;
   a pair of first fasteners, each said first fastener being slidably coupled to a respective said first loop;
   a coupler coupled proximate to a midpoint of said strap, said coupler being configured to couple to a leash, said coupler comprising a ring;
   a pair of strips, each said strip being coupled to and extending from a front edge of said strap, each said strip being positioned proximate to said midpoint of said strap, said ring being positioned around said strap between said pair of strips such that said pair of strips brackets said coupler wherein said ring is slidable along a portion of said strap and inhibited from sliding off of said strap by said strips;
   a pair of second fasteners coupled singly to said pair of strips distal from said front edge, said second fasteners being complementary to said first fasteners, wherein each said second fastener is positioned on a respective said strip such that said second fastener is positioned to couple to a respective said first fastener to form a second loop, wherein each said second loop comprises a respective said first loop, such that said second loop is adjustably sizable; and
   wherein said midpoint of said strap is configured for positioning on a back side of a neck of an animal, such that each said second fastener is positioned to couple to a respective said first fastener to form a second loop, wherein said second loops are transversely positioned across a chest of the animal with front legs of the animal positioned singly through said second loops, such that the animal is harnessed, and wherein said coupler is positioned on said strap such that said coupler is configured to couple to a leash.

2. The assembly of claim 1, further including said strap comprising nylon mesh.

3. The assembly of claim 1, further including said pair of connectors comprising slide buckles.

4. The assembly of claim 3, further including said slide buckles comprising plastic.

5. The assembly of claim 1, further including said ring comprising metal.

6. The assembly of claim 1, further including said ring comprising:
   a first section having opposing ends, said first section being arcuate; and
   a second section coupled to and extending between said opposing ends of said first section.

7. The assembly of claim 1, further including said strips extending perpendicularly from said front edge.

8. The assembly of claim 1, further including said strips comprising nylon mesh.

9. The assembly of claim 1, further including said second fastener and said respective said first fastener comprising a side release buckle.

10. The assembly of claim 9, further including said side release buckle comprising plastic.

11. The assembly of claim 9, further comprising:
    said second fastener comprising a catch end of said side release buckle; and
    said respective said first fastener comprising a hook end of said side release buckle.

12. A harnessing assembly comprising:
    a strap, said strap comprising nylon mesh;
    a pair of connectors, each said connector being coupled to said strap, said strap being couplable to each said connector to form a pair of first loops, said pair of connectors comprising slide buckles, said slide buckles comprising plastic;
    a pair of first fasteners, each said first fastener being slidably coupled to a respective said first loop,
    a coupler coupled proximate to a midpoint of said strap, said coupler being configured to couple to a leash, said coupler comprising a ring positioned around said strap, said ring comprising metal, said ring comprising:
       a first section having opposing ends, said first section being arcuate, and
       a second section coupled to and extending between said opposing ends of said first section;
    a pair of strips, each said strip being coupled to and extending from a front edge of said strap, each said strip being positioned proximate to said midpoint of said strap, said ring being positioned around said strap between said pair of strips such that said pair of strips brackets said coupler wherein said ring is slidable along a portion of said strap and inhibited from sliding off of said strap by said strips, said strips extending perpendicularly from said front edge, said strips comprising nylon mesh;
    a pair of second fasteners coupled singly to said pair of strips distal from said front edge, said second fasteners being complementary to said first fasteners, wherein each said second fastener is positioned on a respective said strip such that said second fastener is positioned to couple to a respective said first fastener to form a second loop, wherein each said second loop comprises a respective said first loop, such that said second loop is adjustably sizable, said second fastener and said respective said first fastener comprising a side release buckle, said side release buckle comprising plastic, said second fastener comprising a catch end of said side release buckle, said respective said first fastener comprising a hook end of said side release buckle; and wherein said midpoint of said strap is configured for positioning on a back side of a neck of an animal, such that each said second fastener is positioned to couple to a respective said first fastener to form a second loop, wherein said second loops are transversely positioned across a chest of the animal with front legs of the animal positioned singly through said second loops, such that the animal is harnessed, and wherein said coupler is positioned on said strap such that said coupler is configured to couple to a leash.

\* \* \* \* \*